US009560497B2

United States Patent
Meyer et al.

(10) Patent No.: US 9,560,497 B2
(45) Date of Patent: Jan. 31, 2017

(54) MULTI-SEGMENT SHORT MESSAGE WITH A READ ACKNOWLEDGMENT REQUEST

(71) Applicants: Dennis Meyer, Annapolis, MD (US); Lewis Tuttle, Queens Town, MD (US)

(72) Inventors: Dennis Meyer, Annapolis, MD (US); Lewis Tuttle, Queens Town, MD (US)

(73) Assignee: Telecommunication Systems, Inc., Annapolis, MD (US)

( * ) Notice: Subject to any disclaimer, the term of this patent is extended or adjusted under 35 U.S.C. 154(b) by 0 days.

(21) Appl. No.: 14/702,018

(22) Filed: May 1, 2015

(65) Prior Publication Data

US 2015/0296353 A1    Oct. 15, 2015

Related U.S. Application Data

(60) Provisional application No. 61/987,847, filed on May 2, 2014.

(51) Int. Cl.
*H04W 4/14* (2009.01)
*H04W 4/18* (2009.01)
*H04M 1/725* (2006.01)

(52) U.S. Cl.
CPC ........... *H04W 4/14* (2013.01); *H04M 1/72552* (2013.01); *H04W 4/18* (2013.01)

(58) Field of Classification Search
CPC ....... H04W 4/14; H04W 4/18; H04M 1/72552
See application file for complete search history.

(56) References Cited

U.S. PATENT DOCUMENTS

| 6,597,918 | B1* | 7/2003 | Kim ..................... H04L 12/5835 370/236 |
| 6,996,520 | B2 | 2/2006 | Levin |
| 7,228,333 | B1* | 6/2007 | Smith ................. H04L 12/5835 709/203 |
| 8,571,524 | B2 | 10/2013 | Atarius |
| 2003/0067889 | A1* | 4/2003 | Petite .................... G01V 1/364 370/310 |
| 2003/0110212 | A1* | 6/2003 | Lewis ..................... H04L 29/06 709/203 |
| 2003/0153302 | A1* | 8/2003 | Lewis .................. G06Q 20/102 455/412.1 |
| 2004/0076126 | A1* | 4/2004 | Qu .......................... H04W 4/06 370/320 |
| 2008/0172365 | A1* | 7/2008 | Ozden .................. G06Q 10/107 |
| 2009/0258632 | A1* | 10/2009 | Sun ..................... H04L 12/5875 455/412.1 |

(Continued)

FOREIGN PATENT DOCUMENTS

| WO | WO 97/20443 | 6/1997 |
| WO | WO 2010/125056 A1 | 11/2010 |
| WO | WO 2011/045009 A1 | 4/2011 |

*Primary Examiner* — Nathan Mitchell
(74) *Attorney, Agent, or Firm* — Tarolli, Sundheim, Covell & Tummino LLP

(57) ABSTRACT

A Short Message Serving System (SMSC) can be configured to determine a format of a short service message (SMS) message with a read acknowledgement request. The SMSC can also be configured to generate a Global System for Mobile Communication (GSM) multi-segment short message that includes user data from the SMS message and comprises a plurality of ordered segments. The GSM multi-segment short message can include a read acknowledgement request.

12 Claims, 4 Drawing Sheets

(56) References Cited

U.S. PATENT DOCUMENTS

| | | |
|---|---|---|
| 2010/0261488 A1 | 10/2010 | Little et al. |
| 2010/0304766 A1* | 12/2010 | Goyal ............... H04L 51/34 455/466 |
| 2011/0238732 A1 | 9/2011 | Mao et al. |
| 2012/0176964 A1* | 7/2012 | Cai ................. H04L 51/38 370/328 |
| 2013/0340094 A1* | 12/2013 | Majeti ............. H04L 63/04 726/28 |
| 2015/0105110 A1 | 4/2015 | Tuttle et al. |

\* cited by examiner

MULTI-SEGMENT SHORT MESSAGE WITH A READ ACKNOWLEDGMENT REQUEST

CROSS-REFERENCE TO RELATED APPLICATION

This application claims the benefit of priority to U.S. Provisional Application No. 61/987,847, filed on May 2, 2014, and entitled EMS OPTIONAL SEGMENT, the entirety of which is herein incorporated by reference.

TECHNICAL FIELD

This disclosure relates to a multi-segment short message with a read acknowledgement request.

BACKGROUND

Text messaging, or texting, is the act of composing and sending brief, electronic messages between two or more mobile phones, or fixed or portable devices over a phone network. The term originally referred to messages sent using the Short Message Service (SMS). However, text messaging has grown to include messages containing image, video, and sound content (known as Multi Media Message Service (MMS) messages). The sender of a text message is known as a texter, while the service itself has different colloquialisms depending on the region.

Enhanced Messaging Service (EMS) is a cross-industry collaboration between manufactures of wireless mobile devices and the carriers of wireless subscriber networks. EMS is an application-level extension to the SMS format for wireless phones available on Global System for Mobile Communications (GSM) networks, code division multiple access (CDMA) networks and other networks (e.g. the Internet).

A User Data Header (UDH) is a binary structure which may be present at the start of a short message (e.g., a text message and/or a message with a digital photograph) segment in the Short Message Service (SMS) in a GSM format and/or a CDMA format. A UDH does not contain text of the short message, and the UDH specifies how the short message should be formatted and processed. Additionally, user data in the short message segment can include the text and/or the coding of a picture (e.g., a digital photograph) for the message.

SUMMARY

One example relates to a non-transitory machine readable medium having machine executable instructions comprising a Short Message Serving System (SMSC) that can be configured to determine a format of a short service message (SMS) message with a read acknowledgement request. The SMSC can also be configured to generate a Global System for Mobile Communication (GSM) multi-segment short message that includes user data from the SMS message and comprises a plurality of ordered segments. The GSM multi-segment short message can include a read acknowledgement request.

Another example relates to an end-user device comprising a wireless computing device, the end-user device can be configured to communicate on a GSM carrier network. The end-user device can also be configured to generate a GSM multi-segment short message that includes user data, the GSM multi-segment short message comprising N number of ordered segments, where N is an integer greater than one, wherein the GSM multi-segment short message includes a read acknowledgement request defined as an Information-Element (IE) in a segment with an order number of zero.

Yet another example relates to a method that can include identifying a recipient device of an SMS message with a read acknowledgement request. The method can also include determining a format of the SMS message with the read acknowledgment request. The method can further include generating a Global System for Mobile Communication (GSM) multi-segment short message with a read acknowledgement request defined in an Information-Element (IE) based on the SMS message with the read acknowledgement request. The method can yet further include forwarding the GSM multi-segment short message with the read acknowledgement request defined in the IE to the recipient device.

DETAILED DESCRIPTION

Systems and methods are described for enabling Read Acknowledgement (Ack) Requests on Global Mobile Communication System (GSM) enabled devices. The systems and methods described herein can convert a short message (e.g., a text message or multimedia message) from a non-GSM format, such as a Code Division Multiple Access (CDMA) or an External Short Messaging Entity (ESME) format with a Read Ack Request into a GSM multi-segment short message with a Read Ack Request implemented as an Information-Element (IE) conforming to the Extended Messaging Service (EMS) extensions protocol. In particular, in some situations, the Read Ack IE can be inserted into segment number '0' of the GSM multi-segment short message thereby avoiding the need to re-order the segments of the GSM multi-segment short message.

Figure 1:
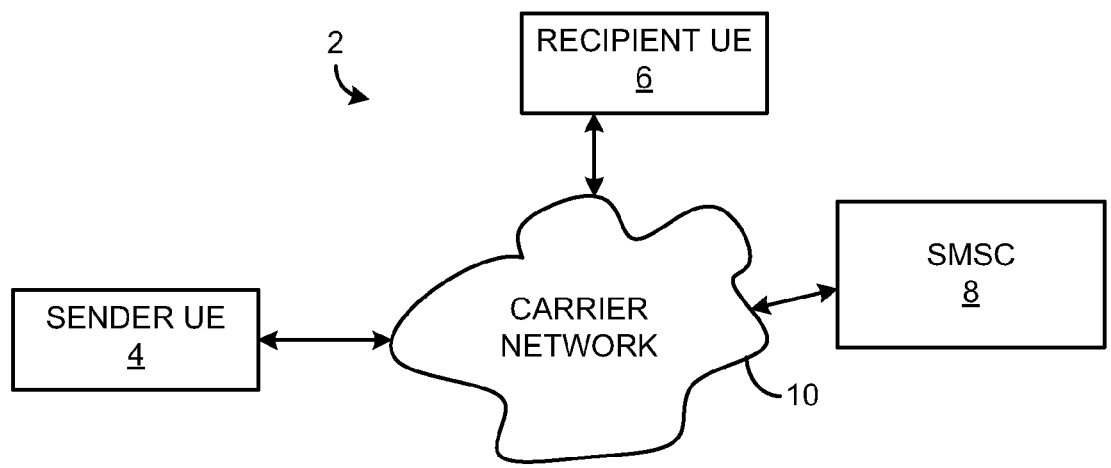
FIG. 1 illustrates an example of a system for processing read acknowledgement requests for short messages.

FIG. 1 illustrates an example of a system 2 for processing and handling a Read Ack Request in a short message. The short message could be Short Message Service (SMS) message, such as, a text message, a multimedia message, etc. The system 2 can include sender user equipment (UE) 52. The sender UE 4 can be implemented, for example, as a wireless device (e.g., a smart phone or a feature phone) a computing device (e.g., a tablet computer, a desktop computer, a laptop computer, etc.) that is capable of sending and receiving short messages. The sender UE 4 can be operating on a Code Division Multiple Access (CDMA) wireless network, such as a CDMA 3rd Generation Partnership Project 2 (3GPP2) network, an external network (e.g., a local area network (LAN), such that the sender UE 4 complies with the External Short Messaging Entity (ESME) standards, etc.

The sender UE 2 can employ a protocol such as the Short Message Peer-to-Peer (SMPP) protocol, the Transmission Control Protocol/Internet Protocol (TCP/IP), etc., to generate a short message that includes a read acknowledgement request (Read Ack Request) for a recipient UE 6. The recipient UE 6 can be implemented as another wireless device and/or another computing device that is capable of sending and receiving short messages. However, the recipient UE 6 is operating on a Global System for Mobile Communications (GSM) network, such as a network complying with the 3rd Generation Partnership Project (3GPP) standard, the European Telecommunications Standards Institute (ETSI) standard, etc. Moreover, throughout this disclosure the term "GSM" can refer to a variety of networks and formats conforming to GSM standards that are commonly referred to as GSM networks, 3GPP networks, and/or ETSI networks or some combination thereof, such as GSM 3GPP networks. The recipient UE 6 can be identified, for example, by a unique identifier (e.g., a phone number, an IP address, an email address, etc.) associated with the recipient UE 6. In some examples, the Read Ack Request can be selected at a graphical user interface (GUI) of the sender UE 4.

In some examples, the Read Ack Request can be included with the short message automatically (e.g., based on a user setting). In other examples, the Read Ack Request can be selected for individual short messages. In yet other examples, the Read Ack Request may only be automatically included for short messages addressed to a particular recipient UE (e.g., UEs included in an address book and/or based on preference set in the address book). The Read Ack can be a Read Ack as defined by the IS637 CDMA 3rd Generation Project 2 (3GPP2) standard, the ESME standards, etc.

The sender UE 4 can send the short message with the Read Ack Request to a Short Message Service Center (SMSC) 8 via a carrier network 10. It is noted that the carrier network 10 can represent multiple carrier networks that are in communication. The SMSC 8 can be implemented, for example, as an application executing on a server or as a stand-alone network appliance. Additionally, the SMSC 8 can be representative of multiple SMSCs that are in communication to facilitate sending and receiving of short messages across the carrier network 10. The SMSC 8 can identify the recipient UE 6 and route the short message with the Read Ack Request to the recipient UE 6. Moreover, due to incompatibilities between the GSM standard and the standard employed in other networks, the SMSC 8 can reformat (e.g., convert) the short message with the Read Ack Request to generate a GSM multi-segment short message. The GSM multi-segment short message can be an Enhanced Messaging Service (EMS) short message (e.g., a text message and/or a multimedia message), such as a GSM multi-segment ESM SMS message. The GSM multi-segment short message can include N number of ordered segments that each include a portion of user data (e.g., text and or a digital photograph) included in the short message with the Read Ack Request, wherein N is an integer greater than one. Each ordered segment can be implemented as a fixed size frame of 140 octets. It is noted that throughout this disclosure, the term "ordered segments" refers an order in which the segments are combined (e.g., by the recipient UE 6). The term "ordered segments" does not specify any required order in which the segments are processed and/or generated. For instance, the SMSC 8 can process and/or generate the N number of ordered segments in any order. Additionally or alternatively, the SMSC 8 can process and/or generate multiple segments concurrently (e.g., via parallel processing).

The SMSC 8 can employ the Read Ack embedded in the SMS request to populate a Read Ack Request Information-Element (IE). An Information-Element Identifier (IEI) is the first octet of an IE and the IEI defines the type of data provided in the IE. The Read Ack Request IE can be included in a User Data Header (UDH) of the short message. For instance, the Read Ack Request can be implemented as a Read Ack Request IE that includes a Read Ack IEI similar to that shown in Table 1.

TABLE 1

READ ACK REQUEST IEI

| TAG \ VALUE (HEX) | LENGTH (BYTES) | VALUE | DESCRIPTION |
|---|---|---|---|
| C0 | 2 | INTEGER | INCLUDED IN A SHORT MESSAGE TO REQUEST A READ ACK FROM UE. NOT REPEATABLE. THE VALUE CONTAINS A VALUE SIMILAR TO A MESSAGE REFERENCE. |

The SMSC 8 can insert the Read Ack Request IE into a UDH of the last ordered segment (e.g., the segment with the highest order number) of the GSM multi-segment short message if the user data and an associated UDH of the short message employ less than a threshold value such as 136 octets (e.g., 135 or less) of the last segment. If the last segment of the GSM multi-segment short message employs more than the threshold value, such as 136 octets or more (e.g., through user data and/or the UDH of the last segment), the SMSC 8 can generate a new segment in the GSM multi-segment short message that contains the Read Ack IE. The new segment can be a segment with an order number of '0' (zero) (e.g., the 0th segment) of the GSM multi-segment short message.

If the recipient UE 6 supports Enhanced Messaging Service (EMS) extensions for the SMS protocol, the recipient UE 6 can generate a Read Ack that confirms that the GSM multi-segment short message from the sender UE 4 has been read, and not just delivered. In some examples, upon opening the short message, the recipient UE 6 can generate a short message for the sender UE 4 with a Read Acknowledgement (Ack). In some examples, the Read Ack can be generated automatically, such as in response to opening the short message. In other examples, a user of the recipient UE 6 can be prompted for a request to send a Read Ack. In yet other examples, the recipient UE 6 can automatically send a Read Ack only to a particular sender of a short message (e.g., particular contacts in an address book).

The Read Ack can be implemented as another IE that includes another IEI tag, such as a Read Ack IE. In other examples, such as situations where the recipient UE 56 does not support the Read Ack Request IE and/or does not support a segment number '0' in the short message, the Read Ack Request IE can be ignored. Thus, the segment number '0' of an SMS short message can be considered to be an optional EMS segment. In situations where the recipient UE 6 generates the short message with the Read Ack IE, the Read Ack IE can include an IEI that can be implemented in a manner described in Table 2.

TABLE 2

READ ACK REQUEST IEI

| TAG VALUE (HEX) | LENGTH (BYTES) | VALUE | DESCRIPTION |
|---|---|---|---|
| C1 | 2 | INTEGER | INCLUDED IN A SHORT MESSAGE TO INDICATE THAT THE SHORT MESSAGE IS A READ RECEIPT. NOT REPEATABLE. THE VALUE CONTAINS THE READ ACK REQUEST IEI PROVIDED IN AN ORIGINAL MESSAGE. THE INCLUDED VALUE IS EMPLOYED BY UE TO CORRELATE THE READ RECEIPT TO THE ORIGINAL MESSAGE. |

In some examples, the Read Ack IE can be sent by itself as a separate SMS message. In other examples, the Read Ack IE can be sent along with a reply short message (e.g., user data). In some examples, upon opening the short message from the sender UE 4, if the recipient UE 6 detects user input (e.g., indicating that a reply short message is being generated), the recipient UE 6 can delay sending the Read Ack IE until the user of the recipient UE 6 finishes inputting the reply short message.

The short message with the Read Ack IE can be provided to the SMSC 8. The SMSC 8 can identify the sender UE 52 and convert the short message with the Read Ack IE into a format compatible with the sender UE (e.g., CDMA or ESME) to form a short message (e.g., an SMS message) with a Read Ack, which compatible format can be the same format of the original short message with the Read Ack Request. The SMSC 8 can forward the (converted) short message with the Read Ack to the sender UE 4. The short message with the Read Ack IE can be employed by the sender UE 4 to confirm that the recipient UE 6 received and opened the original message, namely the short message with the Read Ack Request.

By employing the system 2, incompatibilities related to short messages between a GSM network and other networks (e.g., CDMA, SMPP, TCP/IP networks, etc.) can be rectified. Furthermore, the system 2 can avoid the need to reassemble and/or reorder segments of a GSM multi-segment short message. Instead, as explained, the Read Ack IE can simply be added as a new segment to the beginning (segment number '0') of the GSM multi-segment short message or the Read Ack IE can simply be incorporated into the last ordered segment (e.g., segment with the highest order number) of the GSM multi-segment short message. Moreover, it is noted that in other examples, other features can be employed in the segment number '0' of the short message provided to the recipient UE 56. Additionally, as noted, in the event that the recipient UE 6 is not configured/updated to process Read Ack IEs (e.g., in the UDH of a short message), the Read Ack IE can simply be ignored.

Figure 2:
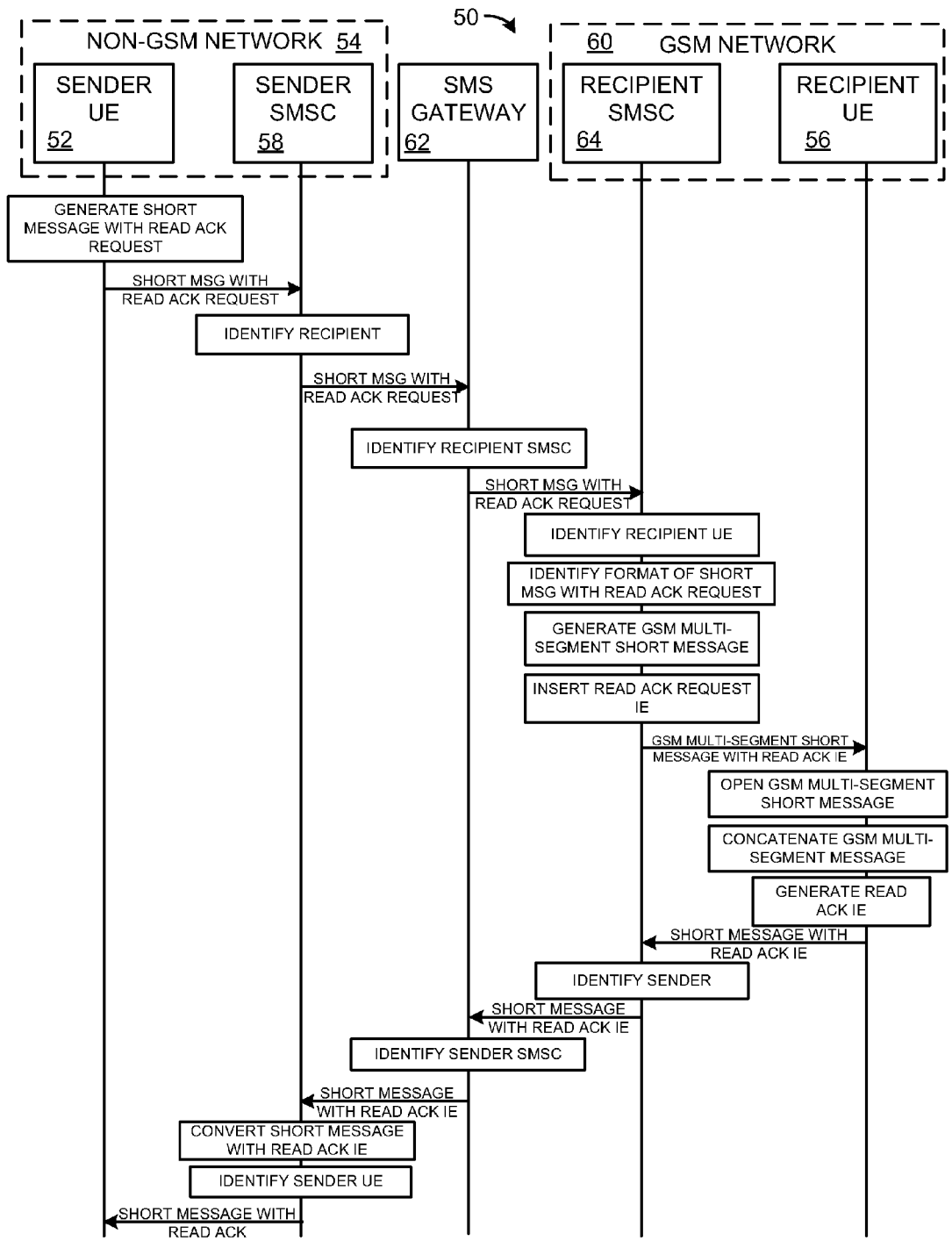
FIG. 2 illustrates a timing diagram of a system for processing read acknowledgement requests for short messages.

FIG. 2 illustrates a timing diagram with a system 50 for processing and handling a Read Ack Request in a short message between two carrier networks. It is noted that in the timing diagram, certain nodes are described as performing certain functions. However, it is to be understood that in other examples, the described functions can be performed in different orders and/or concurrently. Moreover, the functions of multiple nodes may be performed by a single node. The short message could be, for example, an SMS message, such as a text message, a multimedia message, etc.

The system 50 can include a sender UE 52 that operates on a non-GSM network 54. The non-GSM network 54 could be, for example, a Code Division Multiple Access (CDMA) carrier network, such as a CDMA 3GPP2 network. Alternatively, the non-GSM network 54 could be a public network, such as the Internet. The sender UE 52 can be implemented, for example, as a wireless device (e.g., a smart phone or a feature phone) a computing device (e.g., a tablet computer, a desktop computer, a laptop computer, etc.) that is capable of sending and receiving short messages. In some examples, the sender UE 52 can be a subscriber to a carrier network. In other examples, the sender UE 52 can be a node (e.g., an ESME) operating on the Internet. The sender UE 52 can employ the SMS protocol to generate a short message that includes a Read Ack Request for a recipient UE 56.

The Read Ack Request can comply with standards set forth for the non-GSM network 54. For instance, if the non-GSM network 54 is a CDMA network, short message, including the Read Ack Request can be in a CDMA format that complies to IS637 standards. Specifically, in such a situation, the Read Ack Request of the short message can set a "reply_option" field of the short message to '1' to indicate that a read acknowledgement is requested (wherein setting the "reply_option" field to '0' would indicate that no read acknowledgement is requested).

Alternatively, if the sender UE 52 is an ESME, the sender UE 52 can generate the Read Ack Request that complies with the Universal Computer Protocol (UCP), the Short Message Peer-to-Peer (SMPP) protocol, the Computer Interface to Message Distribution (CIMD) protocol, etc. For instance, if the short message conforms to the SMPP protocol, the sender UE 52 can add the Read Ack Request to the short message by setting a bit of the "registered_delivery" field to '1' and insert a relevant "user_message_reference" into the short message. Setting the bit of the "registered_delivery" field to, '1' ('xx1xxxx') indicates that the short message includes a "read acknowledgement request". Conversely, setting the bit of the "registered_delivery" field to, '0' ('xx0xxxx') would indicate that the short message has "no read acknowledgement request".

The recipient UE 56 can be implemented as another wireless device and/or another computing device that is capable of sending and receiving short messages. The recipient UE 56 can be identified, for example, by a unique identifier (e.g., a phone number, an IP address, an email address, etc.) associated with the recipient UE 56. In some examples, the Read Ack Request can be selected at a GUI of the sender UE 52. The sender UE 52 can send the short message with the Read Ack Request to a Short Message Service Center (SMSC) 58 associated with the sender UE 52, which SMSC can be referred to as a sender SMSC 58. The sender SMSC 58 can be implemented, for example, as an application executing on a server or as a stand-alone network appliance.

In some examples, the Read Ack Request can be included with the short message automatically (e.g., based on a user setting). In other examples, the Read Ack Request can be selected for individual short messages. In yet other examples, the Read Ack Request may only be automatically included for short messages addressed to a particular recipient UE (e.g., specific UEs included in an address book).

The sender SMSC 58 can employ a lookup table and/or a database to determine whether the recipient UE 56 is operating on the same carrier network as the sender UE 52. In the present example, the recipient UE 56 operates on a different carrier network, namely a GSM network 60. The GSM network 60 could be, for example, a GSM 3GPP network. Upon determining that the recipient UE 56 is operating on a network external to the non-GSM network 54, the sender SMSC 58 can forward the short message with the Read Ack to an SMS gateway 62. The SMS gateway 62 can be implemented, for example, as an inter-carrier gateway.

The SMS gateway 62 can identify (e.g., via a lookup table and/or a database) an SMSC associated with the recipient, which can be referred to as a recipient SMSC 64. The SMS gateway 62 can forward the short message with the Read Ack Request to the recipient SMSC 64. The recipient SMSC 64 and the recipient UE 56 can each reside on the GSM network 60. As noted, in some examples, certain operations described can be performed on different network nodes than the example illustrated in FIG. 2. For instance, in some examples, some (or all) of the operations of sender SMSC 58 and the recipient SMSC 64 can be implemented on a single SMSC.

The recipient SMSC 64 can be configured to employ a database and/or a look-up table to identify the recipient UE 56. Moreover, due to incompatibilities between the GSM standard and the standards employed in other networks, the recipient SMSC 64 can reformat (e.g., convert) the short message with the Read Ack Request to generate a GSM multi-segment short message.

Specifically, the recipient SMSC 64 can identify a format of the short message with the Read Ack Request. As noted, in some examples, the short message with the Read Ack Request can be in a CDMA format that complies with IS637 standards. Alternatively, the Read Ack Request can be provided from an ESME, such that the short message with the Read Ack Request can be in the formats complying with the UCP, the SMPP protocol, the CIMD protocol, etc., which collectively can be referred to as an "ESME format". Upon determining the format of the short message with the Read Ack Request, the recipient SMSC 64 can generate the corresponding multi-segment short message.

In particular, if the recipient SMSC 64 determines that the short message with the Read Ack Request is in the CDMA format, the recipient SMSC 64 can identify the "read_reply" field of the short message being set to '1' to indicate that the short message includes the Read Ack Request. In response, the recipient SMSC 64 can employ a "message_id" field embedded in the short message to populate a Read Ack Request IE for the GSM multi-segment short message.

Alternatively, in another example, if the recipient SMSC 64 determines that the short message with the Read Ack Request is provided from an ESME and the short message is in the SMPP protocol, the recipient SMSC 64 can employ the message reference embedded in the short message with the Read Ack Request to populate a Read Ack Request IE for the GSM multi-segment short message.

In any such situation, the GSM multi-segment short message can be an EMS short message (e.g., a text message or a multimedia message). The GSM multi-segment short message can include N number of ordered segments that each include a portion of user data (e.g., text, a digital photograph, video, audio or a combination thereof) included in the short message with the Read Ack Request. Each ordered segment can be implemented as a fixed size frame of 140 octets.

Additionally, the recipient SMSC 64 can include a Read Ack IEI into the Read Ack IE of the GSM multi-segment short message. The IEI can be a tag added to an ordered segment of the multi-segment short message. In some examples, the Read Ack Request IEI can be implemented in a manner described in Table 1.

The recipient SMSC 64 can incorporate the Read Ack Request IE (with the Read Ack IEI) into a UDH of the last ordered segment (e.g., the segment with the highest order number) of the GSM multi-segment short message if the user data and an associated UDH employ less than a threshold value, such as 136 octets (e.g., 135 or less) of the last segment. For instance, if the short message generated by the sender UE 52 is a pure text message and contains 160 characters or less, the recipient SMSC 64 can incorporate the Read Ack Request IE (with the Read Ack IEI) into a UDH of the last ordered segment of the GSM multi-segment short message.

Conversely, if the last segment of the GSM multi-segment short message employs more than the threshold value, such as 136 octets or more (e.g., through user data and/or the UDH of the last segment), the recipient SMSC 64 can generate a new segment incorporated into the UDH of the GSM multi-segment short message that contains the Read Ack IE. For instance, if the short message generated by the sender UE 52 is a pure text message and contains 161 characters or more, the recipient SMSC 64 can generate a new segment in the GSM multi-segment short message that contains the Read Ack IE. The new segment can be a segment with an order number of '0' (zero) of the GSM multi-segment short message.

The recipient SMSC 64 can provide the GSM multi-segment short message to the recipient UE 56. The GSM multi-segment short message can be opened at the recipient UE 56 (e.g., via a GUI). Moreover, the recipient UE 56 can concatenate the segments of the GSM multi-segment short message for output, such that the GSM multi-segment short message is output (e.g., via the GUI) as a single message to a user of recipient UE 56. In some examples, upon opening the GSM multi-segment short message, the recipient UE 56 can generate a short message for the sender UE 52 with a Read Ack IE. In some examples, the Read Ack IE can be generated automatically. In other examples, the Read Ack IE can be generated in response to user input. In still other examples, the Read Ack IE can be generated automatically only for certain UEs. In some examples, the Read Ack IE can be sent with a reply message (e.g., in response to user input), and in other examples, the Read Ack IE can be sent in a message by itself.

In some examples, such as situations where the recipient UE 56 does not support the Read Ack Request IE and/or does not support a segment number '0' in a GSM multi-segment short message, the Read Ack Request can be ignored. Thus, the segment number '0' can be considered to be an optional EMS segment. In situations where the recipient UE 56 generates the short message with the Read Ack IE, the Read Ack IE can include a Read Ack IEI (that identifies the Read Ack IE), which can be implemented in a manner described in Table 2.

The short message with the Read Ack IE can be provided to the recipient SMSC 64 by the recipient UE 56. The recipient SMSC 64 can determine that the sender UE 52 operates on a network external to the GSM network 60. Thus, the recipient SMSC 64 can forward the short message with the Read Ack IE to the SMS gateway 62. The SMS gateway 62 can identify the sender SMSC 58 and forward the short message with the Read Ack IE to the sender SMSC 58. The sender SMSC 58 can convert the short message with the Read Ack IE into format appropriate for the sender UE 52. Alternatively, it is specifically noted that in some examples, the recipient SMSC 64 can convert the short message with the Read Ack IE to the appropriate format prior to providing the short message to the SMS gateway 62 in the manner described herein. In still other examples, the conversion of the short message with the Read Ack IE may be omitted.

If the non-GSM network 54 is a CDMA network, the sender SMSC 58 can convert the short message with the Read Ack IE into a CDMA formatted short message with a Read Ack (complying with the IS637 standards). For instance, the sender SMSC 58 can employ, for example, an integer value (e.g., a message reference) included in the Read Ack IE to populate a standard CDMA Read Ack message.

In another situation, if the sender UE 52 is an ESME operating on a public network (e.g., the Internet), the sender SMSC 58 can convert the short message with the Read Ack IE to a format such as a format dictated by the UCP, the SMPP protocol, the CIMD protocol, etc. to form the short message with the Read Ack. For instance, if the short message with the Read Ack IE is to be converted into a short message in the SMPP format, the sender SMSC 58 can set an "esm_class" field of the short message to "xx0101xx", to indicate that the message is a read acknowledgement and insert the integer value (message reference) indicated in the Read ACk IE into a "user_message_reference", and insert an SMSC message_ID of the submitted message into a "message_ID" field of the short message, for message correlation purposes.

The sender SMSC 58 can identify the sender UE 52 and forward the short message with the Read Ack (e.g., in the CDMA or ESME format) to the sender UE 52. The short message with the Read Ack can be employed by the sender UE 52 to confirm that the recipient UE 56 received and opened the original message, namely the short message with the Read Ack Request.

By employment of this system 50, incompatibilities related to short messages between the GSM network 60 and other networks (e.g., CDMA 3GPP2, ESME, etc.) can be rectified. Furthermore, the system 50 avoids the need to reassemble and/or reorder segments of a GSM multi-segment short message. Instead, as explained, if needed, the Read Ack IE can simply be added as a new segment to the beginning (segment number '0') of the GSM multi-segment short message or the Read Ack IEI can simply be incorporated into the last segment (the Nth segment) of the GSM multi-segment short message. Moreover, it is noted that in other examples, other features can be employed in the segment number '0' of the short message provided to the recipient UE 56.

Figure 3:
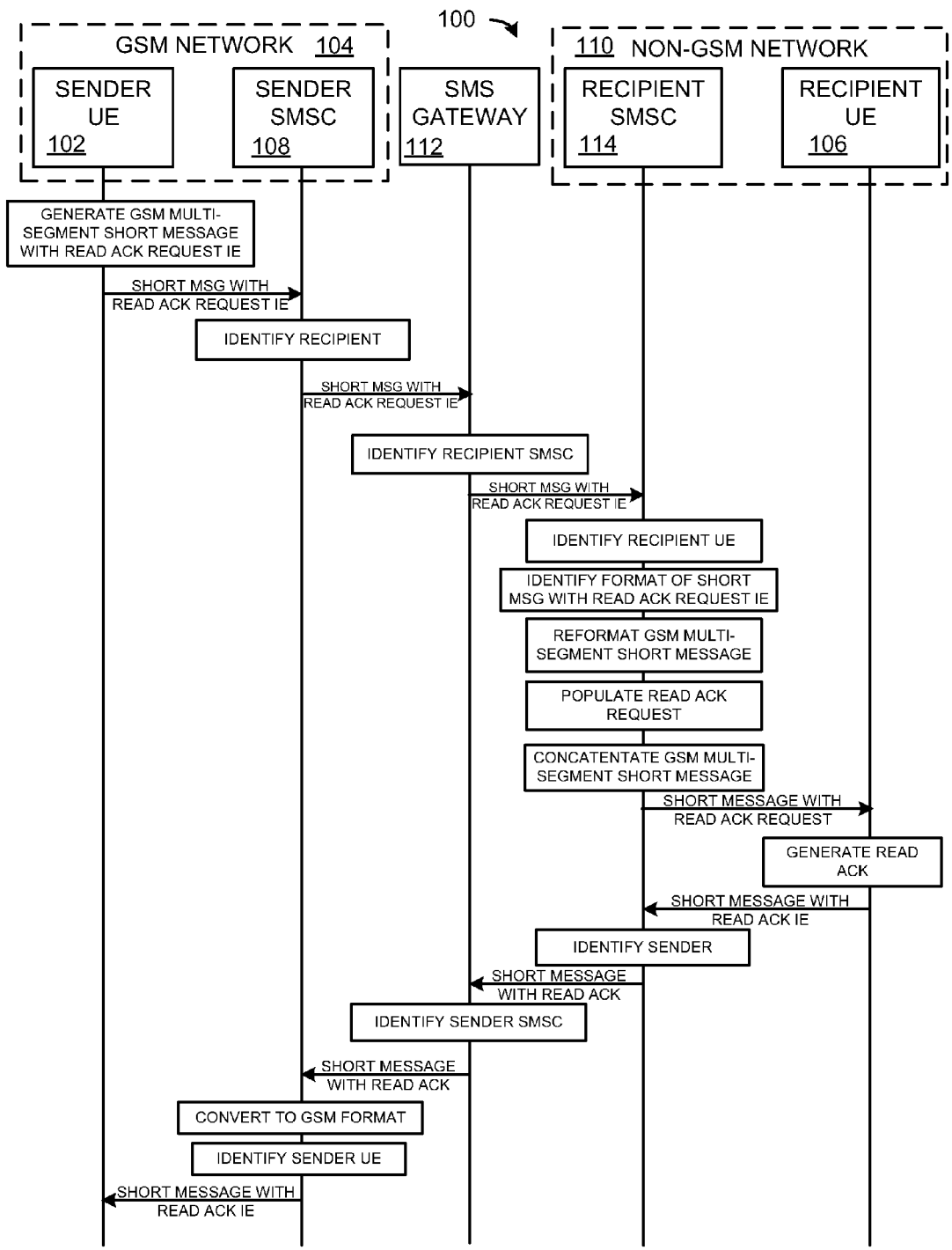
FIG. 3 illustrates another timing diagram of a system for processing read acknowledgement requests for short messages.

FIG. 3 illustrates another timing diagram with a system 100 for processing and handling a Read Ack Request in a short message between two carrier networks. It is noted that in the timing diagram, certain nodes are described as performing certain functions. However, it is to be understood that in other examples, the described functions can be performed in different orders and/or concurrently. Moreover, the functions of multiple nodes may be performed by a single node. The short message could be, for example, an SMS message, such as a text message, a multimedia message, etc. The system 100 can include a sender user UE 102 that operates on a GSM carrier network 104, such as a GSM 3GPP network.

The sender UE 102 can be implemented, for example, as a wireless device (e.g., a smart phone or a feature phone) a computing device (e.g., a tablet computer, a desktop computer, a laptop computer, etc.) that is capable of sending and receiving short messages. The sender UE 102 can employ the SMS protocol to generate a GSM multi-segment message that includes a Read Ack Request for a recipient UE 106. The GSM multi-segment message can have M number of segments, where M is an integer greater than one. The GSM multi-segment message can be an SMS message (e.g., a text message or a multi-media message) that supports EMS.

The Read Ack Request can be implemented as a Read Request IE that includes a Read Request IEI, as described in Table 1. The sender UE 102 can insert the Read Ack Request IE (with the Read Ack IEI) into a UDH of the last (e.g., the Nth) segment of the GSM multi-segment short message if the user data and an associated UDH employ less than the threshold value, such as 136 octets (e.g., 135 or less) of the last segment (e.g., the segment with the highest order number) of the GSM multi-segment short message. For instance, if the short message generated by the sender UE 52 is a pure text message and contains 160 characters or less, the recipient SMSC 114 can incorporate the Read Ack Request IE (with the Read Ack IEI) into a UDH of the last segment of the GSM multi-segment short message. As noted, in some examples, certain operations described can be performed on different network nodes than the example illustrated in FIG. 3. For instance, in some examples, some (or all) of the operations of sender SMSC 108 and the recipient SMSC 114 can be implemented on a single SMSC.

Conversely, if the last segment of the GSM multi-segment short message reaches the threshold value, such as 136 octets or more (e.g., through user data and/or the UDH of the last segment), the sender SMSC 108 can generate a new segment incorporated into the UDH of the GSM multi-segment short message that contains the Read Ack IE. For instance, if the short message generated by the sender UE 102 is a pure text message and contains 161 characters or more, the sender UE 102 can generate a new segment in the GSM multi-segment short message that contains the Read Ack IE. The new segment can be a 0th (zero) numbered segment of the GSM multi-segment short message.

The recipient UE 106 can be implemented as another wireless device and/or another computing device that is capable of sending and receiving short messages. The recipient UE 106 can be identified, for example, by a unique identifier (e.g., a phone number, an IP address, an email address, etc.) associated with the recipient UE 106. In some examples, the Read Ack Request can be selected at a GUI of the sender UE 102. The sender UE 102 can send the short message with the Read Ack Request IE to a sender SMSC 108 associated with the sender UE 102, which SMSC can be referred to as a sender SMSC 108. The sender SMSC 108 can be implemented, for example, as an application executing on a server or as a stand-alone network appliance.

In some examples, the Read Ack Request IE can be included with the short message automatically (e.g., based on a user setting). In other examples, the Read Ack Request IE can be selected for individual short messages. In yet other examples, the Read Ack Request IE may only be automatically included for short messages addressed to a particular recipient UE (e.g., specific UEs included in an address book).

The sender SMSC 108 can employ a lookup table and/or a database to determine whether the recipient UE 106 is operating on the same carrier network as the sender UE 102. In the present example, the recipient UE 106 is on a different carrier network, namely a non-GSM network 110. The non-GSM network 110 could be, for example, a CDMA 3GPP2 network, a public network (e.g., the Internet), etc. Upon determining that the recipient UE 106 is operating on a network external to the GSM network 104, the sender SMSC 108 can forward the short message with the Read Ack request IE to an SMS gateway 112. The SMS gateway 112 can be implemented, for example, as an inter-carrier gateway.

The SMS gateway 112 can identify (e.g., via a lookup table and/or a database) an SMSC 114 associated with the recipient, which can be referred to as a recipient SMSC 114. The SMS gateway 112 can forward the short message with the Read Ack Request IE to the recipient SMSC 114. The recipient SMSC 114 and the recipient UE 106 can each reside on the non-GSM network 110.

The recipient SMSC 114 can be configured to employ a database and/or a look-up table to identify the recipient UE 106. Moreover, due to incompatibilities between the GSM standard and the standard employed in other networks, the recipient SMSC 114 can reformat (e.g., convert) the short message with the Read Ack Request IE to generate a short message with a Read Ack.

Specifically, the recipient SMSC 114 can identify a format of the short message with the Read Ack Request IE. As noted, in some examples, the short message with the Read Ack Request IE can be in the format of a GSM multi-segment message (e.g., a GSM format). Upon determining the format of the short message with the Read Ack Request IE, the recipient SMSC 114 can generate the corresponding short message.

The sender SMSC 108 can convert the short message with the Read Ack Request IE into a format appropriate for the recipient UE 104. Alternatively, it is specifically noted that in some examples, the recipient SMSC 114 can convert the short message with the Read Ack Request IE to the appropriate format prior to providing the short message to the SMS gateway 112 in the manner described herein. In still other examples, the conversion of the short message with the Read Ack IE may be omitted.

If the non-GSM network 110 is a CDMA network, the recipient SMSC 114 can convert the short message with the Read Ack IE into a CDMA formatted short message with a Read Ack Request (complying with the IS637 standards). For instance, in such a situation, the recipient SMSC 114 can convert the GSM multi-segment short message with the Read Ack IE into CDMA format by employing the Read Ack Request IE embedded therein to populate a CDMA mobile terminated "message_id" and "reply_option" of the generated short message. The CDMA "reply_option field" can be set to request a CDMA Read Ack per IS637 standards (a "reply_option" field in a CDMA short message message is set to '1' to indicate that a read acknowledgement is requested, otherwise the "reply_option" field is set to '0').

In another situation, if the recipient UE 106 is an ESME operating on a public network (e.g., the Internet), the recipient SMSC 114 can convert the GSM multi-segment short message with the Read Ack IE to a format such as a format dictated by the UCP, the SMPP protocol, the CIMD protocol, etc. to form the short message with the Read Ack (e.g., an ESME format). For instance, if the short message with the Read Ack Request IE is to be converted into a short message in the SMPP format, the recipient SMSC 114 can set a bit of the "registered_delivery" field to '1' and inserting a relevant "user_message_reference" into the short message. Setting the bit of the "registered_delivery" field to, '1' ('xx1xxxx') indicates that the short message includes a "read acknowledgement request". Conversely, setting the bit of the "registered_delivery" field to, '0' ('xx0xxxx') would indicate that the short message has "no read acknowledgement request".

Moreover, in some examples, the resultant (converted) short message can be concatenated by the recipient SMSC 114 to form a single segment (e.g., a text message up to 160 characters). Thus, user data from the segments of the GSM multi-segment short message with Read Ack IE can be concatenated into a single segment of the short message with the Read Ack Request.

The recipient SMSC 114 can provide the short message with the Read Ack Request to the recipient UE 106. The short message can be opened at the recipient UE 106 (e.g., via a GUI). In some examples, upon opening the short message with the Read Ack Request, the recipient UE 106 can generate a short message for the sender UE 102 with a Read Ack. The short message with the Read Ack can be generated automatically or in response to user input.

The short message with the Read Ack can be provided to the recipient SMSC 114 by the recipient UE 106. The recipient SMSC 114 can determine that the sender UE 102 operates on a network external to the non-GSM network 110. Thus, the recipient SMSC 114 can forward the short message with the Read Ack IE to the SMS gateway 112. The SMS gateway 112 can identify the sender SMSC 108 and forward the short message with the Read Ack IE to the sender SMSC 108. The sender SMSC 108 can convert the short message with the Read Ack into a GSM formatted short message with a Read Ack IE (e.g., an SMS message with EMS extensions). For instance, if the short message with the Read Ack is a CDMA Read Ack or an SMPP short message, the sender SMSC 108 can employ a "message_id" indicated in the Read Ack to populate a read acknowledgement message indicator Information-Element (IE). The Read Ack IE can include a Read Ack IEI, such as the Read Ack IEI described in Table 2. Alternatively, it is specifically noted that in some examples, the recipient SMSC 114 can convert the short message with the Read Ack to the GSM format (a short message with a Read Ack IE) prior to providing the short message to the SMS gateway 112.

The sender SMSC 108 can identify the sender UE 102 and forward the GSM formatted short message with the Read Ack IE to the sender UE 102. The short message with the Read Ack IE can be employed by the sender UE 102 to confirm that the recipient UE 106 received and opened the original message, namely the GSM multi-segment short message with the Read Ack Request IE.

By employment of this system 100, incompatibilities related to short messages between the GSM network 104 and other networks (e.g., CDMA 3GPP2, ESME, etc.) can be rectified. Furthermore, the system 100 avoids the need to reassemble and/or reorder segments of a GSM multi-segment short message. Instead, as explained, the Read Ack Request IE can simply be added as a new segment to the beginning (segment number '0') of the GSM multi-segment short message or the Read Ack IE can simply be incorporated into the last segment (the Mth segment) of the GSM multi-segment short message. Moreover, it is noted that in other examples, other features can be employed in the segment number '0' of the short message provided to the recipient UE 106.

Figure 4:
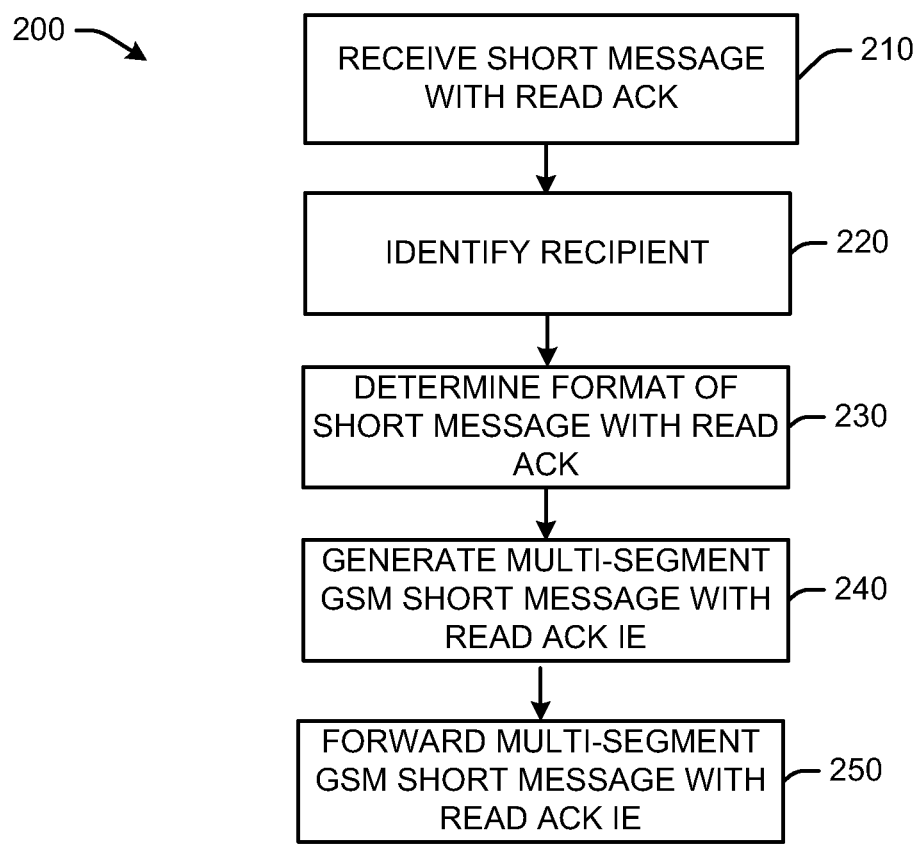
FIG. 4 illustrates a flowchart of an example method for processing read acknowledgement requests for short messages.

In view of the foregoing structural and functional features described above, an example method will be better appreciated with reference to FIG. 4. While, for purposes of simplicity of explanation, the example method of FIG. 4 is shown and described as executing serially, it is to be understood and appreciated that the present examples are not limited by the illustrated order, as some actions could in other examples occur in different orders, multiple times and/or concurrently from that shown and described herein.

Moreover, it is not necessary that all described actions be performed to implement a method. The example method of FIG. 4 can be implemented as instructions stored in a non-transitory machine-readable medium. The instructions can be accessed by a processing resource (e.g., one or more processor cores) and executed to perform the methods disclosed herein.

FIG. 4 illustrates a flowchart of an example method 200 for generating a GSM multi-segment message with a Read Ack Request IE. The method 200 can be implemented by an SMSC, such as the SMSC 8 illustrated in FIG. 1 and/or the recipient SMSC 64 illustrated in FIG. 2. At 210, a short message (e.g., an SMS message) with a Read Ack can be received at the SMSC. At 220, the SMSC can identify a recipient of the short message with the Read Ack Request. At 230, the SMSC can determine a format of the short message with the Read Ack Request.

At 240, the SMSC can generate the GSM multi-segment short message with a Read Ack Request IE based on the determined format of the short message with the Read Ack Request. For example, the GSM multi-segment short message can include user data (e.g., text and/or multimedia) included in the short message with the Read Ack Request. At 250, the GSM multi-segment short message with Read Ack IE can be forwarded to the identified recipient. The Read Ack IE can be inserted into at a last segment of the GSM multi-segment short messaged or the Read Ack IE can be included in a new '0' numbered segment of the GSM multi-segment short message, as described herein.

In view of the foregoing structural and functional description, those skilled in the art will appreciate that portions of the systems and method disclosed herein may be embodied as a method, data processing system, or computer program product such as a non-transitory computer readable medium. Accordingly, these portions of the approach disclosed herein may take the form of an entirely hardware embodiment, an entirely software embodiment (e.g., in a non-transitory machine readable medium), or an embodiment combining software and hardware. Furthermore, portions of the systems and method disclosed herein may be a computer program product on a computer-usable storage medium having computer readable program code on the medium. Any suitable computer-readable medium may be utilized including, but not limited to, static and dynamic storage devices, hard disks, solid-state storage devices, optical storage devices, and magnetic storage devices.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processors of a general purpose computer, special purpose computer, or other programmable data processing apparatus (or a combination of devices and circuits) to produce a machine, such that the instructions, which execute via the one or more processors, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

What have been described above are examples. It is, of course, not possible to describe every conceivable combination of structures, components, or methods, but one of ordinary skill in the art will recognize that many further combinations and permutations are possible. Accordingly, the invention is intended to embrace all such alterations, modifications, and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A non-transitory machine readable medium having machine executable instructions comprising a Short Message Serving System (SMSC) being configured to:
   determine a format of a short service message (SMS) message with a read acknowledgement request;
   generate a Global System for Mobile Communication (GSM) multi-segment short message that includes user data from the SMS message and comprises a plurality of ordered segments, wherein the GSM multi-segment short message includes a read acknowledgement request;
   wherein generating the GSM multi-segment short message comprises generating a segment with an order number of zero for the GSM multi-segment short message in response to determining that an amount data employed in a last segment of the GSM multi-segment message is equal to or greater than a threshold value.

2. The medium of claim 1, wherein the SMSC is further configured to add the read acknowledgement request to the segment with the order number of zero.

3. The medium of claim 1, wherein the threshold value is 136 Octets.

4. A non-transitory machine readable medium having machine executable instructions comprising a Short Message Serving System (SMSC) being configured to:
- determine a format of a short service message (SMS) message with a read acknowledgement request; and
- generate a Global System for Mobile Communication (GSM) multi-segment short message that includes user data from the SMS message and comprises a plurality of ordered segments, wherein the GSM multi-segment short message includes a read acknowledgement request;
- wherein the generating comprises adding the read acknowledgement request to a last segment of the GSM multi-segment short message in response to determining that an mount of data employed in the last segment is less than a threshold value.

5. The medium of claim 1, wherein the GSM multi-segment short message is an SMS message with Extended Messaging Service extensions.

6. The medium of claim 5, wherein the read acknowledgement request comprises a read acknowledgment Information-Element (IE).

7. The medium of claim 6, wherein the read acknowledgment IE comprises an Information-Element-identifier.

8. The medium of claim 1, wherein the format of the SMS message with the read acknowledgment request is a Code Division Multiple Access (CDMA) format.

9. The medium of claim 8, the read acknowledgment request of the SMS message is defined by a reply_option field of the SMS message.

10. The medium of claim 1, wherein the format of the SMS message with the read acknowledgment request is an External Short Messaging Entity (ESME) format.

11. The medium of claim 10, wherein the read acknowledgment request of the SMS message is defined by a registered_delivery field of the SMS message.

12. The medium of claim 1, wherein the SMSC is further configured to convert an GSM SMS message with a read acknowledgment into the same format as the SMS message with the read acknowledgement request.

* * * * *